(No Model.)
2 Sheets—Sheet 1.
J. H. McRAE.
IRON PIPE HEATING DEVICE.
No. 494,484.
Patented Mar. 28, 1893.
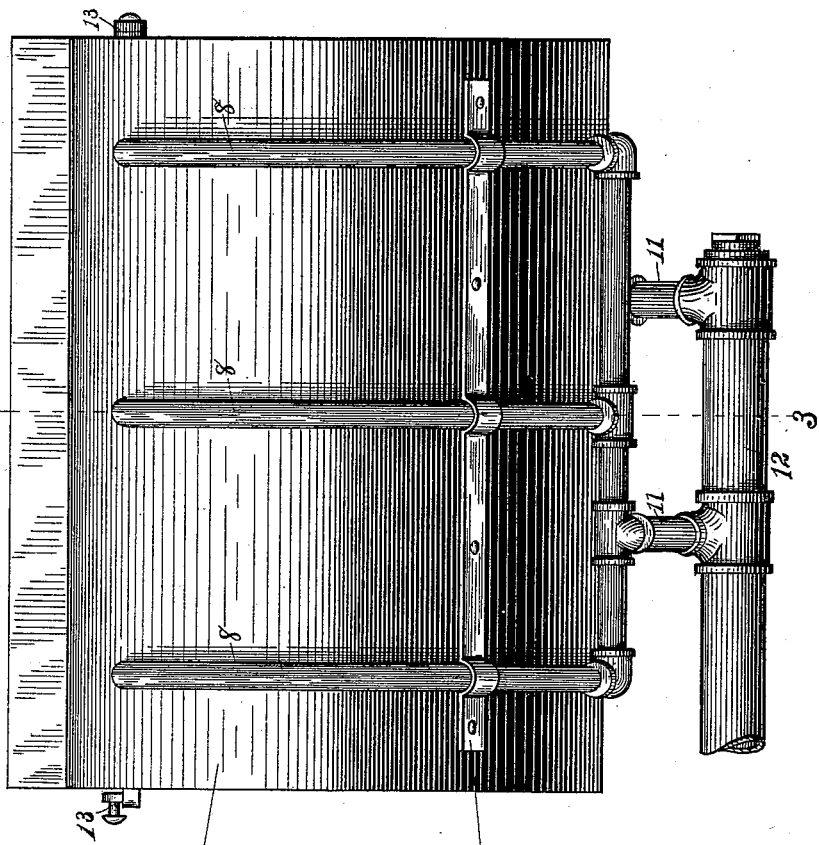
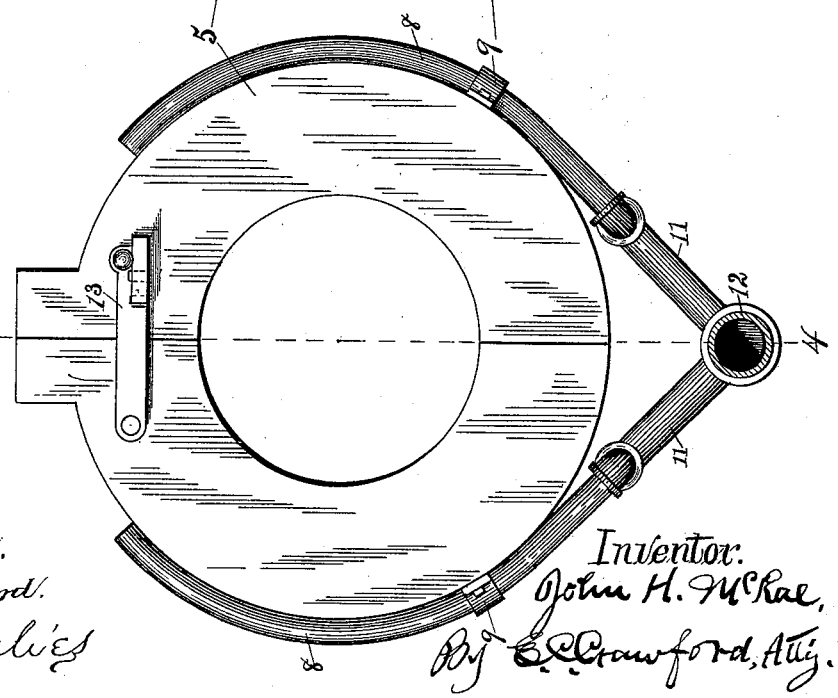
Witnesses.
S. W. Brainard.
W. C. Coolies
Inventor.
John H. McRae,
By E. C. Crawford, Atty.

(No Model.) 2 Sheets—Sheet 2.

J. H. McRAE.
IRON PIPE HEATING DEVICE.

No. 494,484. Patented Mar. 28, 1893.

Witnesses.
W. C. Coches
S. H. Brainard

Inventor.
John H. McRae
By E. C. Crawford, Atty.

UNITED STATES PATENT OFFICE.

JOHN H. McRAE, OF CHICAGO, ILLINOIS.

IRON-PIPE-HEATING DEVICE.

SPECIFICATION forming part of Letters Patent No. 494,484, dated March 28, 1893.

Application filed October 8, 1892. Serial No. 448,242. (No model.)

*To all whom it may concern:*

Be it known that I, JOHN H. MCRAE, a citizen of the United States, residing at Chicago, in the county of Cook, State of Illinois, have invented a new and useful Iron-Pipe-Heating Device, of which the following is a specification.

My invention relates to a device which may be used to heat wrought iron pipes when it is necessary to bend them in placing them for use in conducting gas, oil, water, or other like substances. It has hitherto been necessary, in order to do such heating to build a fire on the ground and place the pipe therein. My contrivance is small enough so that it may be easily carried from place to place. It is made of iron, boiler iron being preferred. It will usually be made in cylindrical shape, and will have perforations made in the sides of its casing, and apertures in the center of its ends, the latter being of such size as to receive the pipe to be heated. It is formed in halves hinged together at one side in some suitable manner and furnished with a latch or other suitable fastening at the other side. Charcoal and coke will be burned in its fire-box. Air pipes are screwed on the outside of it and open into the perforations and are connected with a common pipe into which the current of air may be driven by the use of a blower or hand-bellows.

Figure 4:
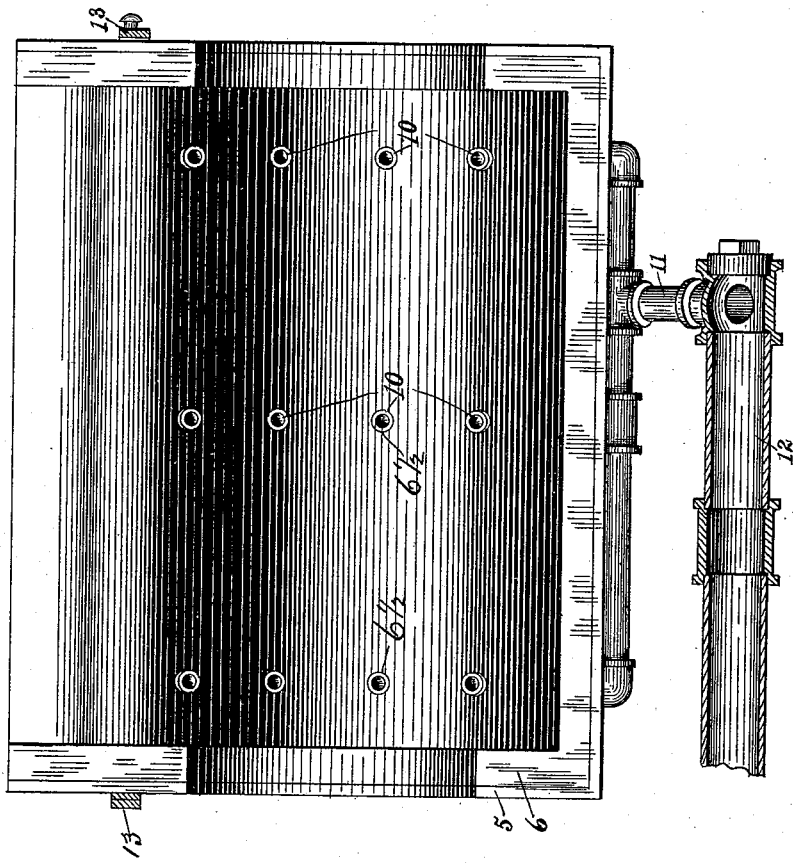
Figure 3:
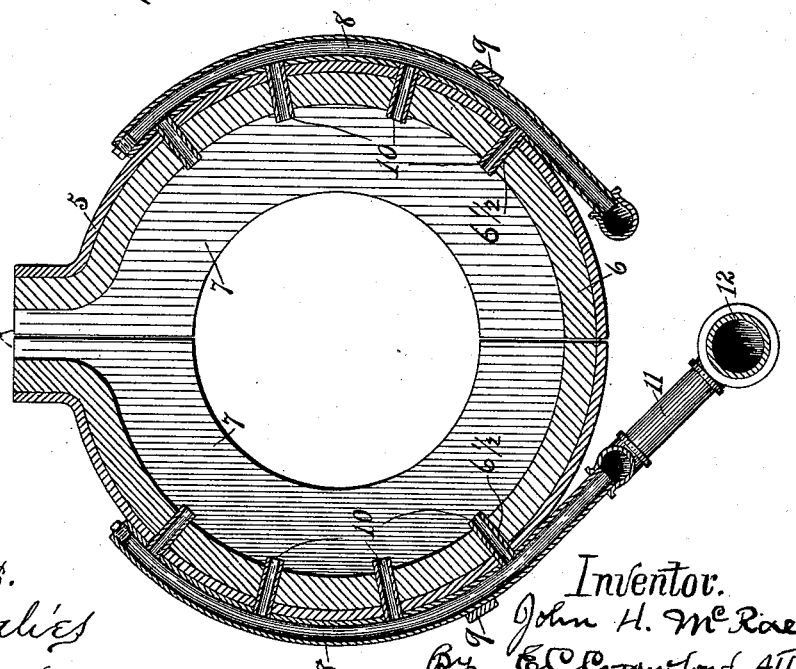

The device is illustrated in the accompanying drawings in which,

Figure 1 is an end elevation of the pipe heating device which constitutes my invention. Fig. 2 is a side elevation of the same. Fig. 3 is a cross section of the same taken on the line 3—3 of Fig. 2. Fig. 4 is a longitudinal section of the same, taken on line 4—4 of Fig. 1.

Like numerals refer to like parts throughout the several views.

5 is the body of the device here represented as being cylindrical in form, though it is not necessarily of that form.

6 is fire-clay, or other suitable lining for the fire-box.

$6\frac{1}{2}$ represents the perforations through the sides into the fire-box 7.

8 represents the gas pipes, or other suitable tubes secured upon the body of the fire-box by the straps 9. These pipes are provided with lateral nipples 10 which extend into the perforations. The pipes 11 connect the above pipes with the pipe 12 which is closed at one end. The pipe 12 provides the axis on which the halves of the body revolve, being an ordinary sectional gas pipe, the sections of which are screwed together and the pipes 11 are screwed onto it laterally.

13 is the latch securing the halves of the fire-box on the other side.

14 is an opening for introducing fuel.

When used the device is placed about the pipe to be heated; charcoal and coke are placed in it and ignited and a blower or hand-bellows is used to force the current of air into the pipe 11 and through the pipes 7 into the fire-box. The fuel in the latter being acted upon by this current will speedily obtain a high degree of heat and the iron pipe within will be speedily heated so that it may be bent as desired.

What I claim as my invention, and desire to secure by Letters Patent, is—

In a pipe heating device, the combination of the halves of an iron fire-box formed with perforations in its sides, and provided with a recess in each end, said halves hinged upon the pipe 12, and held together by a latch 13; the pipes 8 secured upon the fire-box, furnished with the nipples 10, opening into the perforations; the pipe 12 formed with one end closed, and the pipes 11 connecting the pipe 12 with the pipes 8, as and for the purpose specified.

JOHN H. McRAE.

Witnesses:
E. C. CRAWFORD,
CLARA OLSEN.